United States Patent Office 3,398,812
Patented Aug. 27, 1968

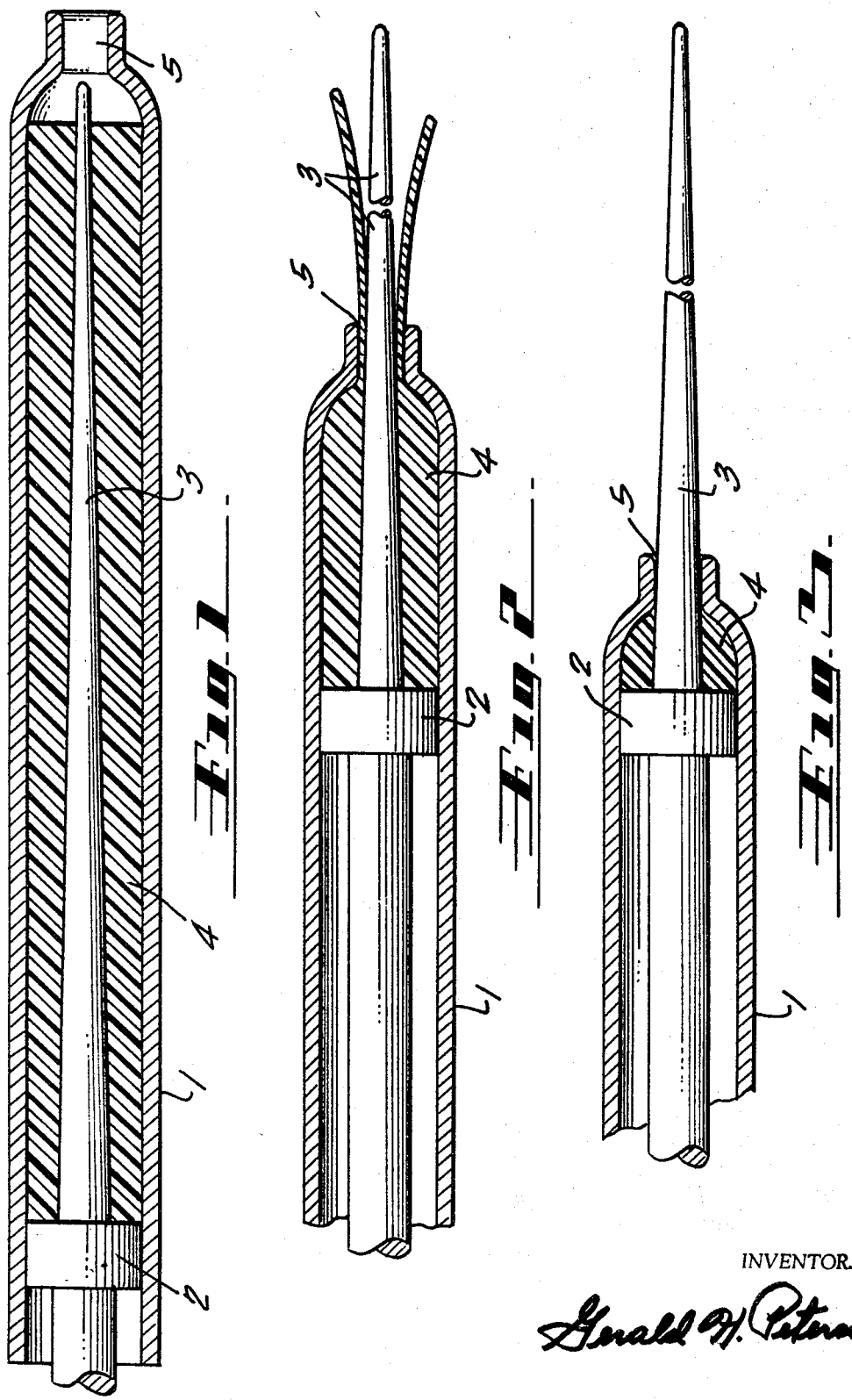

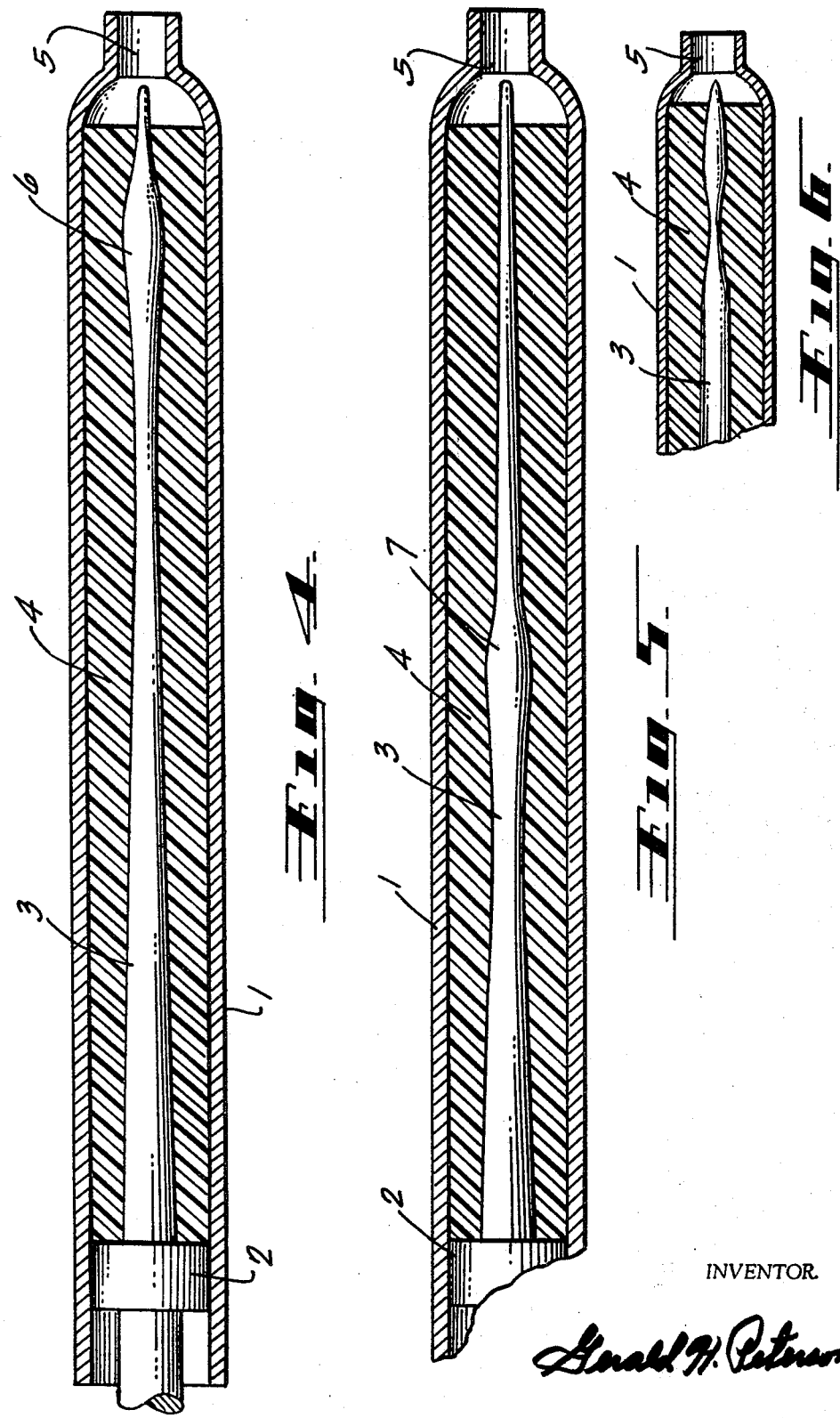

3,398,812
KINETIC ENERGY ABSORBER
Gerald H. Peterson, 1235 S. Westgate,
West Los Angeles, Calif. 90025
Filed Sept. 7, 1966, Ser. No. 577,757
6 Claims. (Cl. 188—1)

ABSTRACT OF THE DISCLOSURE

The invention is a device for absorbing kinetic energy by deformation of plastic material by extrusion comprising an elongated cylinder having an extrusion orifice at one end thereof, a piston within said cylinder adapted to move toward said orifice, plastic material within said cylinder adapted to be extruded through said orifice when said piston moves toward said orifice, and means forward of said piston to vary the resistance to extrusion of said plastic material as said piston moves toward said orifice.

---

This invention relates to a device for the absorption of kinetic energy by deformation of plastic material by extrusion through an orifice.

This invention is an improvement of the invention set out in my Patent No. 2,997,325 relating to the absorption of kinetic energy by deformation of plastic material by extrusion, which patent is incorporated herein by reference. In this invention the deceleration provided by the kinetic energy absorbing device is controlled as the plastic material is being extruded to provide desired variations in the deceleration with the time or position of extrusion.

It is a principal object of this invention to provide a kinetic energy absorber in which plastic material is deformed by extrusion through an orifice a control of the resistance to extrusion as the plastic material is being extruded to provide different decelerations at different positions or times of extrusion.

Other objects and advantages of my invention will be apparent from the description below taken in conjunction with the accompanying drawings.

For illustration and not by way of limitation, my invention will now be exemplified in connection with a description of the drawings in which:

FIGURE 1 shows an arrangement of my invention in which the front of the piston carries a tapered rod to extend through the orifice on extrusion of the plastic material;

FIGURE 2 shows the device of FIGURE 1 with the plastic material partially extruded;

FIGURE 3 shows the device of FIGURE 1 with the piston extruding the plastic material moved to its extreme extent with the rod in front of the piston closing the orifice;

FIGURE 4 shows a modification of my invention in which the rod near the orifice has an enlarged portion to provide an increase in deceleration at the beginning of the extrusion;

FIGURE 5 shows another modification as in FIGURE 4 with the enlarged portion on the rod in about the middle thereof;

FIGURE 6 shows still another modification of my invention in which the rod has a recessed portion to provide a decrease in the deceleration with time and position of extrusion.

Referring to FIGURES 1, 2, and 3 there is shown a cylinder 1 having a piston therewithin 2, plastic material 4 within the cylinder, and an orifice 5 through which the plastic material is extruded. Affixed to the front of the cylinder 2 is rod 3 which is tapered to provide a substantially uniform increase in the deceleration and increase in the resisting force to extrusion with time and displacement of extrusion. FIGURE 2 shows the device of FIGURE 1 with the plastic material partially extruded and with the tapered rod partially filling the orifice to increase the resistance to extrusion at the orifice. FIGURE 3 shows the device of FIGURES 1 and 2 with the piston having reached its extreme of movement and the tapered rod substantially closing the orifice 5.

FIGURE 4 shows a device similar to FIGURES 1, 2, and 3 in which the rod has an enlarged or bulge portion 6 near the orifice. As will be clear to those skilled in the art, this enlargement provides an increase in the deceleration of the kinetic energy absorber near the beginning of extrusion. It will be understood that the showing of the enlargement 6 of the rod 3 is schematic and can have any desired shape to provide the desired variation in deceleration. This is also true with respect to the rest of the rod which can have a diameter along its length to provide the deceleration desired with time and position of extrusion of the plastic material through the orifice 5.

FIGURE 5 shows another modification similar to the device of FIGURE 1 with bulge 7 located at approximately the middle of the rod 3. This enlargement 7 will provide an increase in the deceleration at about the middle of the stroke of the piston 2.

FIGURE 6 shows a further modification with a recession 8 on the rod 3 to provide a decrease in the deceleration with time and position of extrusion.

It will be understood that the rod 3 of the devices of my invention can have any desired shape in cross-section to provide any desired variations in resistance to extrusion of the orifice 5, particularly the rod 3 may have such variations in diameter along its length as may be desired.

The variations in deceleration provided by devices of my invention will be particularly useful in combination with a structure which itself has variations in deceleration with deformation or crushing to provide the desired value of deceleration along the length of action of my device, particularly where in the total arrangement a substantially uniform deceleration is desired.

I claim:

1. The device for absorbing kinetic energy by deformation of plastic material by extrusion comprising an elongated cylinder having an extrusion orifice at one end thereof, a piston within said cylinder adapted to move toward said orifice, plastic material within said cylinder adapted to be extruded through said orifice when said piston moves toward said orifice, and means forward of said piston to vary the resistance to extrusion of said plastic material as said piston moves toward said orifice.

2. The device as defined in claim 1 in which said means comprises a rod within said cylinder affixed to the front face of said piston extending substantially the length of said cylinder and having a cross-sectional dimension so that it will pass through said orifice when said piston moves towards said orifice, said rod having varying cross-sectional area along its length to modify the resistance to extrusion out said orifice with travel of said piston.

3. The device as defined in claim 2 in which said rod is tapered to have a decreasing cross-sectional area with distance away from said piston.

4. The device as defined in claim 2 in which said rod has an enlarged portion along its length to increase resistance to extrusion at the position of said enlarged portion along the length of said rod.

5. The device as defined in claim 2 in which said rod has a recession in cross-sectional area along its length to decrease resistance to extrusion at its position along said rod.

6. The device as defined in claim 2 in which said rod has an enlarged portion along the length thereof to increase resistance to extrusion and a recessed portion along the length thereof to decrease resistance to extrusion.

References Cited

UNITED STATES PATENTS

| | | |
|---|---|---|
| 462,970 | 11/1891 | Krone. |
| 1,783,348 | 12/1930 | Taylor. |
| 1,785,339 | 12/1930 | Daland. |
| 2,997,325 | 8/1961 | Peterson _____ 213—1 X |
| 3,139,989 | 7/1964 | Thornhill _____ 213—223 |
| 3,175,699 | 3/1965 | Price et al. _____ 213—43 |
| 3,225,707 | 12/1965 | Rollins et al. _____ 213—43 X |
| 3,246,866 | 4/1966 | Price et al. _____ 213—43 X |

ARTHUR L. LA POINT, *Primary Examiner.*

STANLEY T. KRAWCZEWICZ, *Assistant Examiner.*